United States Patent
Dai et al.

(10) Patent No.: US 11,262,568 B2
(45) Date of Patent: Mar. 1, 2022

(54) MICROSCOPIC IMAGING SYSTEM AND METHOD

(71) Applicant: TSINGHUA UNIVERSITY, Beijing (CN)

(72) Inventors: Qionghai Dai, Beijing (CN); You Zhou, Beijing (CN); Jiamin Wu, Beijing (CN); Guoxun Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 286 days.

(21) Appl. No.: 16/357,838

(22) Filed: Mar. 19, 2019

(65) Prior Publication Data
US 2020/0241273 A1 Jul. 30, 2020

(30) Foreign Application Priority Data
Jan. 29, 2019 (CN) .......................... 201910085152.9

(51) Int. Cl.
| | |
|---|---|
| *G02B 21/00* | (2006.01) |
| *G02B 21/08* | (2006.01) |
| *G02B 21/36* | (2006.01) |
| *G02B 5/30* | (2006.01) |

(52) U.S. Cl.
CPC .......... *G02B 21/08* (2013.01); *G02B 21/361* (2013.01); *G02B 21/365* (2013.01); *G02B 5/3025* (2013.01)

(58) Field of Classification Search
CPC .... G02B 21/08; G02B 21/361; G02B 21/365; G02B 21/14; G02B 21/0056; G02B 21/0092; G02B 21/02; G02B 21/00; G02B 21/36; G02B 21/0036; G02B 21/0068; G02B 21/06; G02B 21/082; G02B 5/3025; G02B 26/06; G02B 26/08; G02B 3/0087; G02B 27/28; G01N 21/65; G01N 21/21;

(Continued)

(56) References Cited

U.S. PATENT DOCUMENTS

2016/0327779 A1* 11/2016 Hillman ............ G02B 21/0052
2019/0025668 A1* 1/2019 Tzang .................... G01N 29/46

OTHER PUBLICATIONS

Sivankutty et al (Ultra-thin rigid endoscope: two photon imaging through a graded-index multi-mode fiber, Optics Express, vol. 24, No. 2, pp. 825-840, Date: Jan. 25, 2016) (Year: 2016).*

(Continued)

*Primary Examiner* — Stephone B Allen
*Assistant Examiner* — Jyotsna V Dabbi
(74) *Attorney, Agent, or Firm* — David D. Brush; Westman, Champlin & Koehler, P.A.

(57) ABSTRACT

A microscopic imaging system and a microscopic imaging method. The system includes: an illumination module configured to generate a laser illumination, an LCOS device located in a Fourier plane of the laser illumination and configured to modulate a phase of the laser illumination, a 4-F system configured to adjust a size of a light beam of the laser illumination, an excitation lens group configured to generate a point illumination focused in a sample plane, a detecting lens group configured to capture an image of a PSF of the point illumination, a camera sensor, and a controller configured to synchronously control a change in a phase pattern of the LCOS device and an image capture of the camera sensor.

14 Claims, 2 Drawing Sheets

(58) Field of Classification Search
CPC ............... G01N 21/3581; G01N 21/59; G01N 2201/0675
USPC ........................................................ 359/368
See application file for complete search history.

(56) References Cited

OTHER PUBLICATIONS

Conkey et al., "Genetic algorithm optimization for focusing through turbid media in noisy environments", Feb. 27, 2012, vol. 20, No. 5, Optics Express 4840-4849.

Runze et al., "Interleaved segment correction achieves higher improvement factors in using genetic algorithm to optimize light focusing through scattering media", 2017 Journal of Optics, vol. 19, 105602, 11 pages.

English translation of the Chinese Office Action dated Dec. 16, 2019 for corresponding Chinese Application No. 201910085152.9.

* cited by examiner

MICROSCOPIC IMAGING SYSTEM AND METHOD

CROSS-REFERENCE TO RELATED APPLICATION

This application claims priority to and benefits of Chinese Patent Application Serial No. 201910085152.9, filed with the State Intellectual Property Office of P. R. China on Jan. 29, 2019, the entire content of which is incorporated herein by reference.

FIELD

The present disclosure relates to a field of microscopic imaging systems, and more particularly to a microscopic imaging system and a microscopic imaging method based on a gradient-index (GRIN) lens for wavefront focusing.

BACKGROUND

In the two-photon microscopy, the gradient-index (GRIN) lens is a commonly-used endoscopic probe for the study of cell morphology. However, the GRIN lens is limited in various biological applications due to its intrinsic low spatial resolution and low light collection efficiency. The reason is that only small angular lights can be focused when passing through the singlet GRIN lens. In contrast, a part of large angular lights cannot be reflected by the inside border of the GRIN lens and will exit out of the surface. The rest of the large angular lights may be reflected by the inside border, but cannot converge to the previous focusing point, thus increasing the aberration.

SUMMARY

Embodiments of the present disclosure seek to solve at least one of the problems existing in the related art to at least some extent.

Accordingly, embodiments of a first aspect of the present disclosure provide a microscopic imaging system, including:

an illumination module configured to generate a laser illumination with a size of a collimated beam and a preset linear polarization direction, a liquid crystal on silicon (LCOS) device located in a Fourier plane of the laser illumination and configured to modulate a phase of the laser illumination, a 4-F system configured to adjust a size of a light beam of the laser illumination to match with a front focal plane of a subsequent objective lens, an excitation lens group including a first objective lens and a GRIN lens and configured to generate a point illumination focused in a sample plane, a detecting lens group configured to capture an image of a point spread function (PSF) of the point illumination, a camera sensor, and a controller configured to synchronously control a change in a phase pattern of the LCOS device and an image capture of the camera sensor to perform a real-time feedback and a genetic algorithm (GA) optimization.

Embodiments of a second aspect of the present disclosure provide a microscopic imaging method, including:

an initialization step: randomly generating an initial guess of a phase pattern population and setting relative parameters;

a display step: displaying each phase pattern of a current population in turn, capturing a modulated PSF image by a camera sensor corresponding to each phase pattern, and calculating a cost value of each phase pattern according to the captured image until all phase patterns of the current population have been displayed once;

a ranking step: ranking all the phase patterns of the current population according to corresponding calculated cost values, in which a phase pattern with a larger cost value has a higher rank;

a selecting step: selecting a ma pattern and a pa pattern from the current population according to the ranking, in which a phase pattern with a higher rank is selected with a higher possibility;

a breeding step: generating one random binary matrix M as a mask for each time and calculating a temporary offspring $O_T$ according to a formula of $O_T = ma \cdot M + pa \cdot (1-M)$;

a mutation step: choosing some elements of the temporary offspring $O_T$ with a preset mutation rate and changing a phase of each of the elements from 0 to $2\pi$ equiprobably and randomly to generate a final offspring $O_F$, in which the breeding step and the mutation step are repeated until a preset offspring number is obtained;

a replacing step: using the newly generated offspring to replace phase patterns with lower cost value ranks in the current population to generate a new phase pattern population;

performing an iteration according to the above steps to obtain a final optimized pattern, and focusing the light beams into the sample plane after passing through the GRIN lens.

Embodiments of a third aspect of the present disclosure provide a computer-readable storage medium having stored therein computer programs that, when executed by a processor of a terminal, causes the terminal to perform a microscopic imaging method, in which the method includes:

randomly generating an initial guess of a phase pattern population and setting relative parameters;

displaying each phase pattern of a current population in turn, capturing a modulated PSF image by a camera sensor corresponding to each phase pattern, and calculating a cost value of each phase pattern according to the captured image until all phase patterns of the current population have been displayed once;

ranking all the phase patterns of the current population according to corresponding calculated cost values, in which a phase pattern with a larger cost value has a higher rank;

selecting a female parent ma pattern and a male parent pa pattern from the current population according to the ranking, in which a phase pattern with a higher rank is selected with a higher possibility;

generating one random binary matrix M as a mask for each time and calculating a temporary offspring $O_T$ according to a formula of $O_T = ma \cdot M + pa \cdot (1-M)$;

choosing some elements of the temporary offspring $O_T$ with a preset mutation rate and changing a phase of each of the elements from 0 to $2\pi$ equiprobably and randomly to generate a final offspring $O_F$, in which the breeding step and the mutation step are repeated until a preset offspring number is obtained;

using the newly generated offspring to replace phase patterns with lower cost value ranks in the current population to generate a new phase pattern population;

performing an iteration according to the above steps to obtain a final optimized pattern, and focusing the light beams into the sample plane after passing through the GRIN lens.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
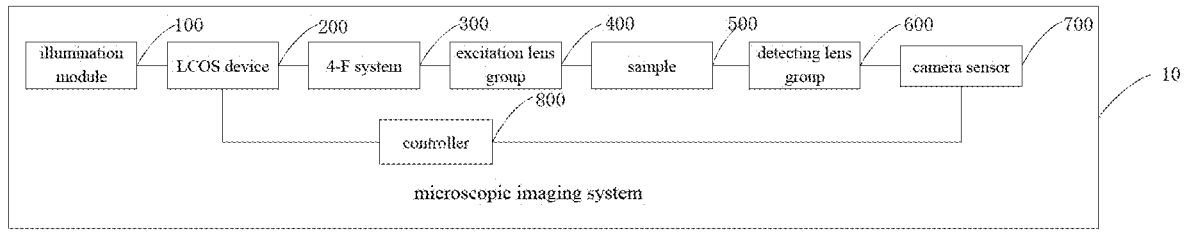
FIG. 1 is a block diagram of a microscopic imaging system according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

A microscopic imaging system of the present disclosure is described with references to the accompanying drawings.

FIG. 1 is a block diagram of a microscopic imaging system according to an embodiment of the present disclosure.

As shown in FIG. 1, the microscopic imaging system includes: an illumination module 100, a liquid crystal on silicon (LCOS) device 200, a 4-F system 300, an excitation lens group 400, a sample 500, a detecting lens group 600, a camera sensor 700 and a controller 800.

Specifically, the illumination module 100 is configured to generate a laser illumination with a size of a collimated beam and a preset linear polarization direction. The LCOS device 200 is located in a Fourier plane of the laser illumination and configured to modulate a phase of the laser illumination. The 4-F system 300, consisting of two relay lenses with different and appropriate focal lengths, is configured to adjust a size of a light beam of the laser illumination to match with a front focal plane of a subsequent objective lens. The excitation lens group 400 includes a first objective lens and a GRIN lens and is configured to generate a point illumination focused in a plane of the sample 500. The detecting lens group 600 is configured to capture an image of a point spread function (PSF) of the point illumination. The controller 800 is configured to synchronously control a change in a phase pattern of the LCOS device and an image capture of the camera sensor 700 to perform a real-time feedback and a genetic algorithm (GA) optimization.

With above system, the light efficiency and spatial resolution of the GRIN-lens-based imaging system are improved and errors and optical aberrations are reduced in the system.

In an embodiment of the present disclosure, the illumination module 100 includes a laser source 101, a beam expander 102 and a polarizer 103.

Specifically, the beam expander 102 including a first lens and a second lens forming another 4-F system is configured to expand a diameter of the light beam of the laser illumination to match with a size of a projective surface of the LCOS device, and the polarizer 103 is configured to adjust a linear polarization direction of the laser illumination according to a polarization property of the projective surface of the LCOS device 200 to modulate the phase distribution of the laser illumination.

Further, the laser source illuminates on a screen of the LCOS device, and the LCOS projects a pattern displayed on the LCOS device. The projective surface of the LCOS device is the display screen of the LCOS device and the beam expander 102 can expand the diameter of the light beam of the laser source 101 to match with the size of the screen of the LCOS device, such that the illumination on the screen of the LCOS is uniform.

In an embodiment of the present disclosure, the system further includes a pinhole located in a Fourier plane between the first lens and the second lens as a spatial filter. Specifically, the pinhole has a preset diameter of 20 µm.

In an embodiment of the present disclosure, the LCOS device 200 is configured to project a random phase pattern to modulate a wavefront distribution and to optimize the projected phase pattern in each feedback and iteration process, so as to focus the illumination and reduce aberration.

In an embodiment of the present disclosure, the 4-F system 300 includes a third lens and a fourth lens and is configured to adjust the size of the light beam of the laser illumination to project the phase pattern on the front focal plane of the subsequent objective lens and allow a size of the phase pattern to overfill a range of an entrance pupil plane of the objective lens, and the microscopic imaging system further includes a scanning system including galvanometers which is located in a Fourier plane between the third lens and the fourth lens and configured to perform a two-dimensional point scanning in the sample plane.

In an embodiment of the present disclosure, the first objective lens and the GRIN lens are configured to collect incident light beams with a plurality of angles and focus the incident light beams at one point of the sample plane.

In an embodiment of the present disclosure, the detecting lens group 600 includes a second objective lens and a tube lens, and is configured to expand a PSF of the illumination and relay the PSF to the camera sensor to capture an image of the PSF.

It should be noted that the systems shown in the figures are only illustrated, and some optical elements commonly used, like the dichroscope and the spectral filter, are omitted in the figures for simplicity.

With the microscopic imaging system according to embodiments of the present disclosure, the PSF of the illumination through the GRIN lens are optimized by the modulation. The optimized phase pattern is acquired according to the GA, the illumination of the system is modulated for wavefront focusing, thus improving the imaging performances of the optical system of the GRIN-lens-based two-photon endoscopy, such as improving the light collection efficiency and the spatial resolution, and correcting the aberrations of the system.

Figure 2:
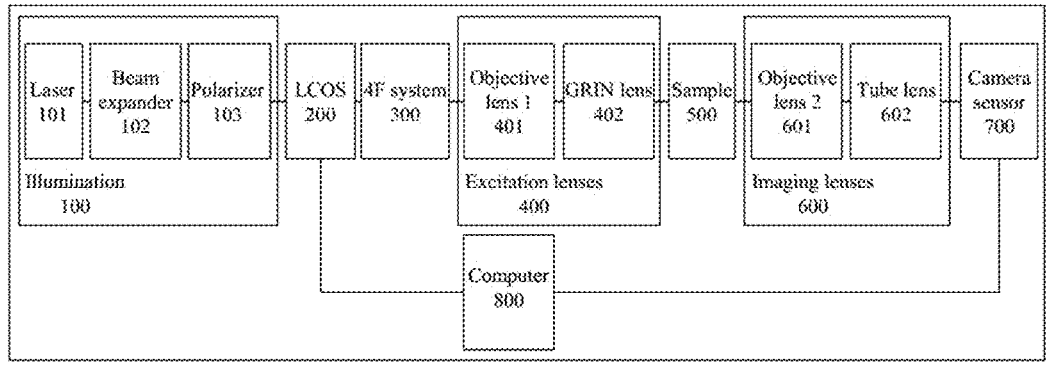
FIG. 2 is a block diagram of a microscopic imaging system according to an embodiment of the present disclosure.

In a specific embodiment of the present disclosure, as shown in FIG. 2, the imaging system includes an illumination module 100, an LCOS device 200, a 4-F system 300, an excitation lens group 400, a sample 500, a detecting lens group 600, a camera 700 (with a sensor) and a controller 800 being a computer.

Specifically, the illumination module 100 includes a laser source 101, a beam expander 102 and a polarizer 103, and is configured to generate a laser illumination with a size of a collimated beam and a preset linear polarization direction. The LCOS device 200 is located in a Fourier plane of the laser illumination and configured to modulate a phase of the laser illumination. The 4-F system 300 is configured to adjust a size of a light beam of the laser illumination to match with a front focal plane of a subsequent objective lens 401. The excitation lens group 400 including a first objective lens 401 and a GRIN lens 402 is configured to generate a point illumination focused in a plane of the sample 500. The detecting lens group (also known as a group of imaging lenses) 600 includes a second objective lens 601 and a tube lens 602 matched to the objective lens 601, and is functioned together with the camera 700 to capture an image of a PSF of the point illumination. The computer 800 is configured to synchronously control a change in a phase pattern of the LCOS device 200 and an image capture of the camera sensor 700 to perform a real-time feedback and a GA optimization.

Figure 3:
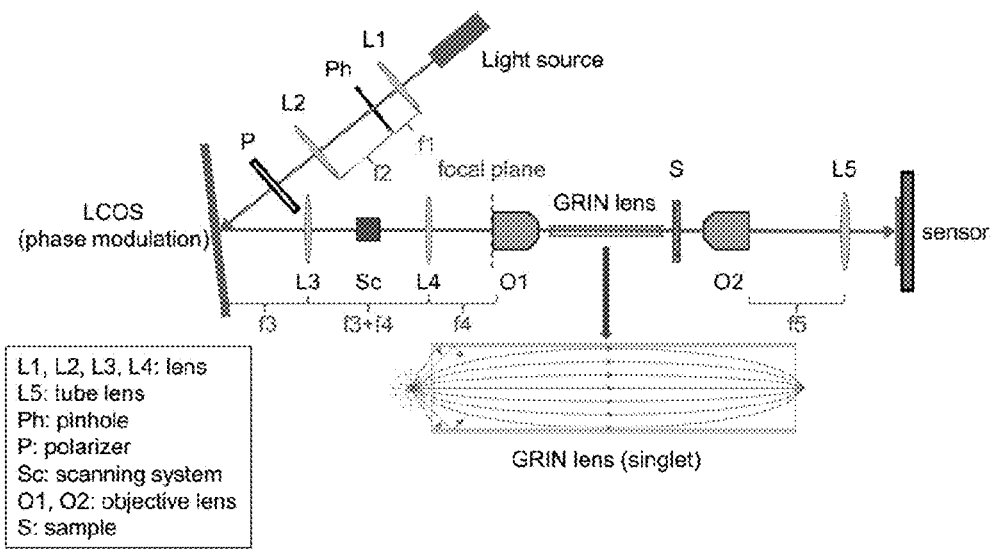
FIG. 3 is a schematic diagram showing a microscopic imaging system according to an embodiment of the present disclosure.

In an embodiment of the present disclosure, as shown in FIG. 3, the beam expander 102 including a first lens L1 and a second lens L2 forming another 4-F system is configured to expand a diameter of the light beam of the laser source 101 to match with a size of a projective surface of the LCOS device.

In an embodiment of the present disclosure, in the illumination module 100, a pinhole Ph with a preset diameter of 20 μm is located in a Fourier plane between the first lens and the second lens as a spatial filter.

In an embodiment of the present disclosure, in the illumination module 100, a polarizer P is used to adjust a linear polarization direction of the laser illumination according to a polarization property of the projective surface of the LCOS device 200 to modulate the phase distribution of the laser illumination.

In an embodiment of the present disclosure, as shown in FIG. 3 the LCOS device 200 is configured to project a random phase pattern to modulate a wavefront distribution and to optimize the projected phase pattern in each feedback and iteration process, so as to focus the illumination and reduce aberration.

In an embodiment of the present disclosure, as shown in FIG. 3, the 4-F system 300 includes a third lens L3 and a fourth lens L4 and is configured to adjust the size of the light beam of the laser illumination to project the phase pattern on the front focal plane of the subsequent objective lens 401 and allow a size of the phase pattern to overfill a range of the front focal plane, and the microscopic imaging system further includes a scanning system Sc including galvanometers which is located in a Fourier plane between the third lens L3 and the fourth lens L4 and configured to perform a two-dimensional point scanning in the sample plane.

In an embodiment of the present disclosure, as shown in FIG. 3, the excitation lens group 400 includes a first objective lens O1 and a GRIN lens, and the first objective lens and the GRIN lens are configured to collect incident light beams with a plurality of angles and focus the incident light beams at one point of the sample plane 500.

In an embodiment of the present disclosure, as shown in FIG. 3, the detecting lens group 600 includes a second objective lens O2 and a tube lens L5, and is configured to expand a PSF of the illumination and relay the PSF to the camera sensor 700 to capture an image of the PSF.

With the microscopic imaging system according to embodiments of the present disclosure, an optimal phase pattern is searched according to the real-time feedback system and the GA, the phase pattern is projected by the LCOS device configured to modulate an image of a PSF of an illumination, so as to focus light beams into a sample plane and obtain a small illumination excitation point, thus improving the light collection efficiency and the spatial resolution of the GRIN-lens-based imaging system and reducing the errors and optical aberrations of the system.

A microscopic imaging method of the present disclosure is described with references to the accompanying drawings.

Figure 4:
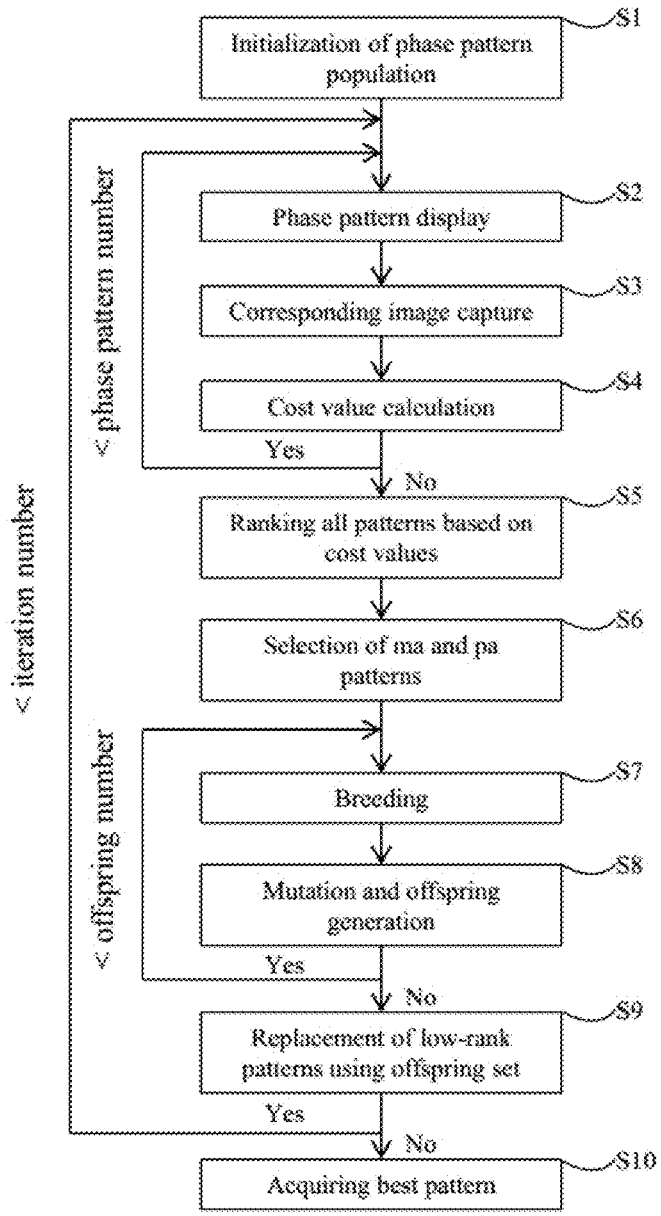
FIG. 4 is a flow chart of a microscopic imaging method according to an embodiment of the present disclosure.

FIG. 4 is a flow chart of a microscopic imaging method according to an embodiment of the present disclosure.

As shown in FIG. 4, according to the microscopic imaging method of the present disclosure, a phase pattern is searched according to the real-time feedback system and the GA method. The phase pattern is then projected by an LCOS device, which is configured to modulate a PSF of an illumination to focus light beams into a sample plane and obtain a small illumination excitation point.

Specifically, the method includes following steps.

In S1, an initialization step, a computer 800 is used to randomly generate an initial guess of a phase pattern population and set relative parameters.

In S2, a display step, each phase pattern of a current population is displayed by the LCOS device 200 in turn.

In S3, a modulated PSF image corresponding to each phase pattern is captured by a camera sensor 700.

In S4, a cost value of each phase pattern is calculated according to the captured image until all phase patterns of the current population have been displayed once.

In S5, a ranking step, the computer is used to rank all the phase patterns of the current population according to corresponding calculated cost values, in which a phase pattern with a larger cost value has a higher rank.

In S6, a selecting step, a female parent (ma) pattern and a male parent (pa) pattern are selected by the computer 800 from the current population according to the ranking, in which a phase pattern with a higher rank is selected with a higher possibility, and the ma pattern and the pa pattern are used to generate a mutated mask pattern.

In S7, a breeding step, one random binary matrix M is generated as a mask by the computer 800 for each time and a temporary offspring $O_T$ is calculated according to a formula of $O_T = ma \cdot M + pa \cdot (1-M)$.

In S8, a mutation step, the computer 800 is used to choose some elements of the temporary offspring $O_T$ with a preset mutation rate, and change a phase of each of the elements from 0 to $2\pi$ equiprobably and randomly to generate a final offspring $O_F$.

The breeding step and the mutation step are repeated until a preset offspring number is obtained.

In S9, a replacing step, the newly generated offspring is used by the computer 800 to replace phase patterns with lower cost value ranks in the current population to generate a new phase pattern population.

In S10, an iteration process is performed by repeating the above steps e.g., for thousand times, to obtain a final optimized pattern, the light beams are focused into the sample plane after passing through the GRIN lens since the modulation of the pattern is optimized.

In an embodiment of the present disclosure, the initialization step includes: setting relative parameters including a total iteration number (5000 to 10000), a phase pattern population number (30 to 60), an offspring number (½ or ⅓ of the phase pattern population number), and a mutation rate (a fixed number or a number in a degressive manner);

generating the initial guess of the phase pattern population (a matrix set) using a random distribution, where phase values of all elements (pixels) in the pattern are from 0 to $2\pi$ with a step of $\pi/4$;

adjusting a size of the phase pattern by a 4-F system 300 to be greater than a size of a front focal plane of an objective lens 401;

setting pixels in a block (e.g., 10×10 pixels in the block) with the same phase value when the phase pattern is projected by the LCOS device, to obtain a stable wavefront modulation performance.

In an embodiment of the present disclosure, in the display step, the cost value corresponding to each phase pattern is equal to a sum of tens of pixel values in a central part of the image captured by the camera sensor 700.

It should be understood that, the foregoing explanations of the embodiments of the microscopic imaging system is also applicable to the method of the present disclosure, and thus will not be described herein for the avoidance of repetition.

With the microscopic imaging method according to embodiments of the present disclosure, an optimal phase pattern is searched according to the real-time feedback system and the GA, the phase pattern is projected by the LCOS device configured to modulate an image of a PSF of an illumination, so as to focus light beams into a sample plane and obtain a small illumination excitation point, thus improving the light collection efficiency and the spatial resolution of the GRIN-lens-based imaging system and reducing the errors and optical aberrations of the system.

Moreover, Embodiments of the present disclosure provide a computer-readable storage medium having stored therein computer programs that, when executed by a processor of a terminal, causes the terminal to perform a microscopic imaging method, in which the method includes:

randomly generating an initial guess of a phase pattern population and setting relative parameters;

displaying each phase pattern of a current population in turn, capturing a modulated PSF image by a camera sensor corresponding to each phase pattern, and calculating a cost value of each phase pattern according to the captured image until all phase patterns of the current population have been displayed once;

ranking all the phase patterns of the current population according to corresponding calculated cost values, in which a phase pattern with a larger cost value has a higher rank;

selecting a female parent ma pattern and a male parent pa pattern from the current population according to the ranking, in which a phase pattern with a higher rank is selected with a higher possibility;

generating one random binary matrix M as a mask for each time and calculating a temporary offspring $O_T$ according to a formula of $O_T = ma \cdot M + pa \cdot (1-M)$;

choosing some elements of the temporary offspring $O_T$ with a preset mutation rate and changing a phase of each of the elements from 0 to $2\pi$ equiprobably and randomly to generate a final offspring $O_F$, in which the breeding step and the mutation step are repeated until a preset offspring number is obtained;

using the newly generated offspring to replace phase patterns with lower cost value ranks in the current population to generate a new phase pattern population;

performing an iteration according to the above steps to obtain a final optimized pattern, and focusing the light beams into the sample plane after passing through the GRIN lens.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "a schematic embodiment", "an example", "a specific example" or "some examples" means that a particular feature, structure, material, or characteristic described in connection with the embodiment or example is included in at least one embodiment or example of the present disclosure. Thus, the appearances of the phrases such as "an embodiment", "some embodiments", "a schematic embodiment", "an example", "a specific example" or "some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A microscopic imaging system, comprising:
an illumination module comprising a laser source, a beam expander and a polarizer, and configured to generate a laser illumination with a size of a collimated beam and a preset linear polarization direction,
a liquid crystal on silicon (LCOS) device located in a Fourier plane of the laser illumination and configured to modulate a phase of the laser illumination,
a 4-F system configured to adjust a size of a light beam of the laser illumination to match with a front focal plane of a subsequent objective lens, wherein the 4-F system comprises a third lens and a fourth lens and is configured to adjust the size of the light beam of the laser illumination to project the phase pattern on the front focal plane of the subsequent objective lens and allow a size of the phase pattern to be greater than a range of an entrance pupil plane,
an excitation lens group comprising a first objective lens and a gradient-index (GRIN) lens and configured to generate a point illumination focused in a sample plane, wherein the first objective lens is the subsequent objective lens for the 4-F system,
a scanning system comprising galvanometers which is located in a Fourier plane between the third lens and the fourth lens and configured to perform a two-dimensional point scanning in the sample plane,
a detecting lens group configured to capture an image of a point spread function (PSF) of the point illumination,
a camera sensor, and
a controller being a computer, and configured to synchronously control a change in a phase pattern of the LCOS device and an image capture of the camera sensor to perform a real-time feedback and a genetic algorithm (GA) optimization.

2. The microscopic imaging system according to claim 1, wherein
the beam expander comprising a first lens and a second lens forming another 4-F system is configured to expand a diameter of the light beam of the laser illumination to match with a size of a projective surface of the LCOS device, and
the polarizer is configured to adjust a linear polarization direction of the laser illumination according to a polarization property of the projective surface of the LCOS device to modulate a phase distribution of the laser illumination.

3. The microscopic imaging system according to claim 1, further comprising a pinhole located in a Fourier plane between the first lens and the second lens as a spatial filter.

4. The microscopic imaging system according to claim 3, wherein the pinhole has a preset diameter of 20 μm.

5. The microscopic imaging system according to claim 1, wherein the LCOS device is configured to project a random phase pattern to modulate a wavefront distribution and to optimize the projected phase pattern in each feedback and iteration process.

6. The microscopic imaging system according to claim 1, wherein the first objective lens and the GRIN lens are configured to collect incident light beams with a plurality of angles and focus the incident light beams at one point of the sample plane.

7. The microscopic imaging system according to claim 1, wherein the detecting lens group comprises a second objective lens and a tube lens, and is configured to expand a PSF of the illumination and relay the PSF to the camera sensor to capture an image of the PSF.

8. A microscopic imaging method performed by using a microscopic imaging system, comprising:
an illumination module comprising a laser source, a beam expander and a polarizer, and configured to generate a laser illumination with a size of a collimated beam and a preset linear polarization direction,
a liquid crystal on silicon (LCOS) device located in a Fourier plane of the laser illumination and configured to modulate a phase of the laser illumination,
a 4-F system configured to adjust a size of a light beam of the laser illumination to match with a front focal plane of a subsequent objective lens, wherein the 4-F system comprises a third lens and a fourth lens and is configured to adjust the size of the light beam of the laser illumination to project the phase pattern on the front focal plane of the subsequent objective lens and allow a size of the phase pattern to be greater than a range of an entrance pupil plane,
an excitation lens group comprising a first objective lens and a gradient-index (GRIN) lens and configured to generate a point illumination focused in a sample plane, wherein the first objective lens is the subsequent objective lens for the 4-F system,
a scanning system comprising galvanometers which is located in a Fourier plane between the third lens and the fourth lens and configured to perform a two-dimensional point scanning in the sample plane,
a detecting lens group configured to capture an image of a point spread function (PSF) of the point illumination,
a camera sensor, and
a controller being a computer, and configured to synchronously control a change in a phase pattern of the LCOS device and an image capture of the camera sensor to perform a real-time feedback and a genetic algorithm (GA) optimization,
wherein the method comprises:
an initialization step: randomly generating an initial guess of a phase pattern population and setting relative parameters;
a display step: displaying each phase pattern of a current population in turn, capturing a modulated PSF image by the camera sensor corresponding to each phase pattern, and calculating a cost value of each phase pattern according to the captured image until all phase patterns of the current population have been displayed once;
a ranking step: ranking all the phase patterns of the current population according to corresponding calculated cost values, wherein a phase pattern with a larger cost value has a higher rank;
a selecting step: selecting a ma pattern and a pa pattern from the current population according to the ranking, wherein a phase pattern with a higher rank is selected with a higher possibility;
a breeding step: generating one random binary matrix M as a mask for each time and calculating a temporary offspring $O_T$ according to a formula of $O_T$=ma·M+pa·(1−M);
a mutation step: choosing some elements of the temporary offspring $O_T$ with a preset mutation rate and changing a phase of each of the elements from 0 to 2π equiprobably and randomly to generate a final offspring $O_F$, wherein the breeding step and the mutation step are repeated until a preset offspring number is obtained;
a replacing step: using the newly generated offspring to replace phase patterns with lower cost value ranks in the current population to generate a new phase pattern population; and
performing an iteration according to the above steps to obtain a final optimized pattern, and focusing the light beams into the sample plane after passing through the GRIN lens.

9. The microscopic imaging method according to claim 8, wherein the initialization step comprises:
setting relative parameters comprising a total iteration number, a phase pattern population number, an offspring number, and a mutation rate;
generating the initial guess of the phase pattern population using a random distribution, where phase values of all elements in the pattern are from 0 to 2π with a step of π/4;
adjusting a size of the phase pattern by the 4-F system to be greater than a size of the front focal plane of the objective lens;
setting pixels in a block with the same phase value when the phase pattern is projected by the LCOS device.

10. The microscopic imaging method according to claim 8, wherein in the display step, the cost value corresponding to each phase pattern is equal to a sum of tens of pixel values in a central part of the image captured by the camera sensor.

11. The microscopic imaging method according to claim 9, wherein the total iteration number is in a range of 5000 to 10000.

12. The microscopic imaging method according to claim 9, wherein the phase pattern population number is in a range of 30 to 60.

13. The microscopic imaging method according to claim 9, wherein the offspring number is in a range of ½ or ⅓ of the phase pattern population number.

14. The microscopic imaging method according to claim 9, wherein the mutation rate is fixed or in a degressive manner.

* * * * *